United States Patent

Mailhot

[11] Patent Number: 5,862,541
[45] Date of Patent: Jan. 26, 1999

[54] SWIMMING POOL SKIMMER WELL FROG RESCUE DEVICE

[76] Inventor: Louis Mailhot, 2304, Croissant du Sablier, St-Lazare, Québec, Canada, J7T 2E2

[21] Appl. No.: 944,425

[22] Filed: Oct. 6, 1997

[51] Int. Cl.⁶ .................................................. A01K 61/00
[52] U.S. Cl. .............................. 4/496; 210/169; 119/221; 4/494
[58] Field of Search ..................... 119/221, 246, 119/256; 210/269, 169; 4/496, 494; 248/444.1, 451; 211/33

[56] References Cited

U.S. PATENT DOCUMENTS

| 4,555,084 | 11/1985 | Anderson et al. | 248/460 |
| 5,356,109 | 10/1994 | Biasini | 248/448 |
| 5,377,623 | 1/1995 | Parr . | |
| 5,692,719 | 12/1997 | Shepherd | 248/460 |
| 5,791,624 | 8/1998 | Fedrick | 248/460 |

*Primary Examiner*—J. Casimer Jacyna
*Assistant Examiner*—Kerry S. Culpepper
*Attorney, Agent, or Firm*—F. Martineau

[57] ABSTRACT

The exit ramp of the invention comprises a flat, discoid base lying flatly on the bottom wall of a conventional pool skimmer screen bucket. An upright post is fixed to the base and vertically extends beyond the bucket upper edge. An inclined platform is pivotally installed upon the post upper end. The platform is selectively pivoted into a position in which it will reach or extend beyond the pool skimmer well upper edge, so as to allow small animals caught in the pool skimmer well to climb onto the platform and exit the pool skimmer well onto the pool deck. Elastic strings are provided on the exit ramp post to allow attachment thereof onto the screen bucket upper edge, for a removable but fixed engagement of the exit ramp with the screen bucket.

9 Claims, 3 Drawing Sheets

SWIMMING POOL SKIMMER WELL FROG RESCUE DEVICE

FIELD OF THE INVENTION

The present invention relates to an exit ramp for small animals, and more particularly to a swimming pool skimmer well exit ramp for small animals trapped therein.

BACKGROUND OF THE INVENTION

Outdoor, in-ground swimming pools are often subjected to the undesirable visit on the part of small animals, especially batrachia including spiders and other insects, and salamanders and small snakes. These animals are attracted by the large water body, and dive in without any consideration of a way out. Once a frog jumps into a swimming pool, it becomes trapped, firstly because the frog cannot "jump" since it will simply sink into the water during the jumping motion, and secondly because the upper side walls of the swimming pool are too steep and smooth for the frog to grasp and climb the surface thereof. Thus, they stay trapped in the pool water, swim but eventually tire and drift with the water current into the pool skimmer. There, they will try to remain at the surface of the water, fighting against drowning from the downward current. Once inside the pool skimmer, escape through the pool skimmer well opening back into the pool is difficult, due to the incoming water current. Sometimes, if strength and energy is sufficient, they will be able to escape from the bottom of the pool skimmer and come back at the surface of the water. When their strength wears out, after a strenuous battle for life itself, they will drown to the bottom of the skimmer basket, and die. Not only is this a sad period for the batrachian, but also for the pool owner, who will have to empty his pool filter, which can contain several dead animals, especially after rainy nights. This can be a problem in the case of outdoor, in-ground pools which are located out of the cities, i.e. in the open country, where the occurence of such above-mentioned small animals is rather frequent. Not only does the pool owner have to empty the screen bucket of his pool filter, but also the water itself may be contaminated by the decaying corpses of the dead animals, which then represent clean-up and health safety problems for the pool owner.

U.S. Pat. No. 5,377,623 issued in 1995 to J. A. Parr discloses an apparatus for rescuing frogs from swimming pools. This invention comprises a small platform having an integral annular bracket destined to snappingly engage the post of the pool ladder at water level. In use, the frog trapped in the pool water may climb onto the platform, and from there jump from the water onto the pool deck and thus escape its otherwise fatal destiny.

An important problem with this invention is that the platform is located on the periphery of a usually very large pool, and thus the frog may not swim or drift onto the platform. The frog is more likely to drift with the water current into the pool skimmer, remain trapped therein and never have access to the salutary platform.

Another problem with this platform is that it is intended for use by batrachia able to jump up onto the higher located pool deck. Indeed, the platform must be positioned at water level for it to be functional, and thus a vertical jump of six inches or more will be necessary to reach the safety of the pool deck. Some small frogs, salamanders or small snakes will not be able to perform this achievement and reach the pool deck from the platform.

Yet another problem with the above invention is that the water level may lower or rise under or above the platform. Indeed, the platform must be manually vertically sled along the ladder post to position it at water level. Thus, if the water level varies—e.g. during dry weather, it may lower under the platform, and during rainy weather, it may rise above the platform—then the platform may again be useless to the frogs trapped in the pool.

Another problem with the platform of the Parr patent is that a swimmer may accidentally hit it and possibly damage or break it, especially the rather small bracket holding the platform to the ladder post.

OBJECTS OF THE INVENTION

It is the gist of the invention to provide an exit ramp allowing small animals trapped in a water body to escape to the dry ground.

It is an important object of this invention that the exit ramp be adapted to be located where the water current will most likely carry the small animals.

It is another object of this invention that the exit ramp allow animals of all sizes and shapes to exit the water.

It is yet another object of the present invention that the exit ramp be useful whether the pool water level is higher or lower than normal.

It is an object of the invention to provide an exit ramp that will not be prone to be hit or damaged by swimmers.

It is an important object of this invention to provide an exit ramp that can be installed in conventional outdoor, in-ground swimming pools in a retrofit fashion.

SUMMARY OF THE INVENTION

The present invention relates to a swimming pool skimmer well exit ramp for small animals trapped therein.

More particularly, the present invention relates to a rescue device for use in a water body, allowing small animals to escape from the water thereby, the water body of the type having an edge circumscribing it and beyond which lies solid ground, said rescue device comprising:

a) an upright supporting foot member defining an upper and a lower end, and destined to stably rest by its said lower end onto a rigid wall surface submerged into the water body;

b) an elongated platform having an upper surface, said platform being attached in inclined position at an intermediate section thereof to said foot member upper end and defining an upper and a lower edge;

wherein said foot member is sized so that said inclined platform lower edge be located at approximately the water lever, and said platform upper edge is destined to extend out of the water and away from the water body to the dry ground, for escape by the small animals.

Preferably, said platform member has traction means on its upper surface to assist the animals in climbing thereon.

Preferably, said traction means include a plurality of grooves made transversely of said platform upper surface all along the length thereof.

Advantageously, said rescue device further includes means for mounting said platform for relative movement to said foot member upper end, for allowing forcible orientation adjustment of said platform relative to said foot member, while maintaining the selected orientation of the platform under unbiased condition.

The present invention further relates to an animal rescue device for use inside a swimming pool skimmer well, for allowing stranded small animals to escape from the well to dry land, the swimming pool well being made into the swimming pool side wall and having a top mouth above water level and a lateral access port partly beneath water level; said rescue device comprising:

a) a supporting foot member defining an upper and a lower end, and destined to stably rest by its said lower end on the flooring of said pool skimmer well;

b) an elongated platform having an upper surface; and c) mounting means, for mounting an intermediate section of said elongated platform to said foot member upper end for relative movement thereabout, and for maintaining same in an inclined position so as to define an upper and a lower extremity thereof;

wherein said rescue device is destined to be partly submerged in the water of the pool, with said inclined platform lower extremity destined to be approximately at the water level and said platform upper extremity destined to extend upwardly therefrom out of the water and beyond the well top mouth.

Preferably, the invention comprises the rescue device in combination with a skimmer bucket sized to fit wholly inside the swimming pool well, said bucket having a peripheral perforated wall, a bottom base wall edgewisely integral to said peripheral wall, and a top open mouth; wherein said foot member freely rests on said bucket base wall and extends upwardly therefrom and through said bucket top mouth, and at least a major section of said platform extends above said bucket top mouth.

Preferably, said rescue device further comprises attachment means installed on said foot member for fixedly and removably attaching said rescue device to the skimmer basket.

Preferably, said attachment means is a pair of elastic strings attached to said foot member and provided with hooks destined to removably engage said screen bucket upper edge.

Preferably, said foot member comprises an upright post and a substantially flat base destined to flatly engage the screen bucket bottom wall, said base allowing passage of the water at least partly through the screen bucket bottom wall.

Preferably, said platform member has traction means on its upper surface to help the animals to climb thereon.

Preferably, said traction means are grooves made transversely of said platform upper surface all along the length thereof.

DETAILED DESCRIPTION OF THE PREFERRED EMBODIMENTS

Figure 1:
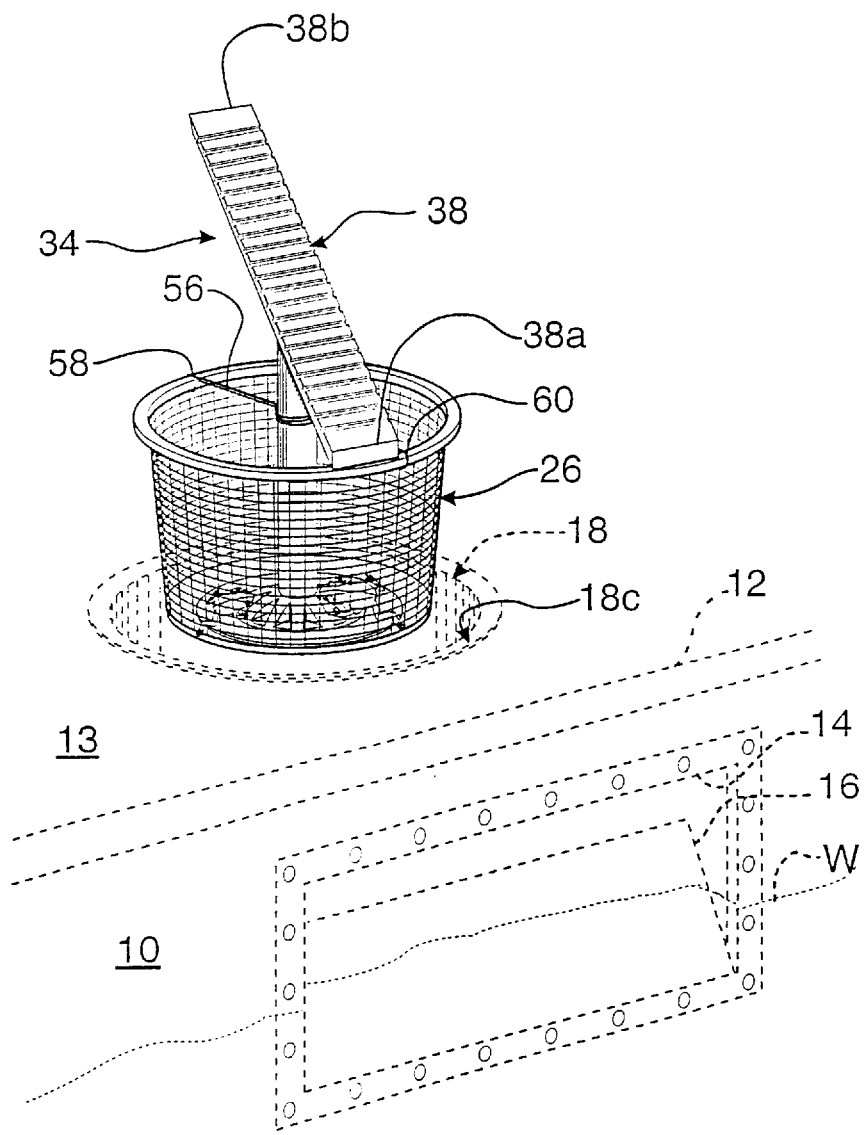
FIG. 1 is a perpective view showing in dotted lines a conventional outdoor, in-ground swimming pool side wall top edge portion, having a skimmer well lateral opening on its peripheral wall, and in full lines the pool skimmer screen bucket with the exit ramp according to the invention operatively installed therein, the screen bucket being vertically removed from the skimmer well area for clarity of the drawing.

FIG. 1 shows in dotted lines a conventional swimming pool peripheral wall 10 having a top edge 12 around which is located the horizontal pool deck 13, the pool being filled with water W up to a level short of top edge 12. Upright wall 10 is provided with a conventional skimmer opening 14, through which the water may enter, carrying debris to be filtered out of the water therein. Opening 14 may be provided with a hinged access door 16.

Figure 2:
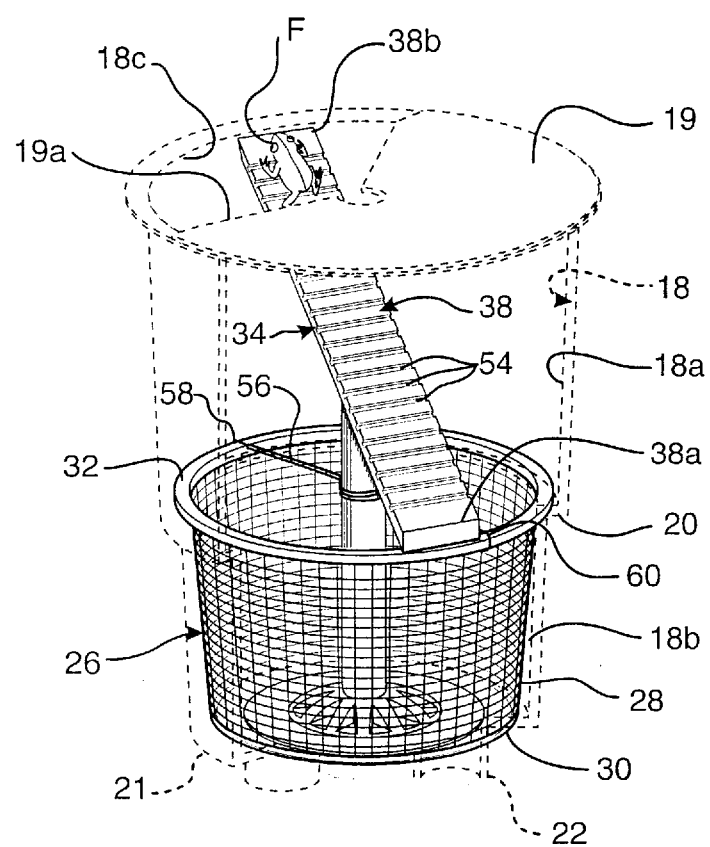
FIG. 2 is a perspective view showing the pool skimmer screen bucket in full lines, operatively installed inside the pool skimmer area, the latter being suggested in dotted lines.

Opening 14 allows water therethrough into a skimmer well 18, best shown in FIG. 2. Skimmer well 18 is substantially cylindrical, and preferably has a shoulder 20 at its intermediate portion separating an upper diametrally larger well portion 18a from a lower diametrally slightly smaller well portion 18b. A well upper edge 18c is located adjacent the pool deck 12, and a cover 19 is provided atop the well upper edge 18c. The floor portion 21 of skimmer well 18 opens up into an outlet pipe 22, which is connected to the water pump at a remote location. Thus, the pool water is drawn through the upright wall opening access part 14, into well 18 and down into outlet pipe 22.

A conventional screen bucket 26 is sized to coaxially freely fit in well lower portion 18b, and is diametrally slightly smaller than the peripheral wall of lower portion 18b, so as to easily be inserted or retracted therefrom. Screen bucket 26 is thus also cylindrical, having a cylindrical peripheral open wall 28, a bottom wall 30 resting on well floor 21, and a top annular edge 32, the latter resting on the skimmer well shoulder 20. The whole body of screen bucket 26 forms a perforated screen, so as to allow the water to pass therethrough, while screening the water from any macroparticulate debris. Pool owners regularly remove screen bucket 26 to empty it of leaves, branches, insects and other debris.

Figure 3:
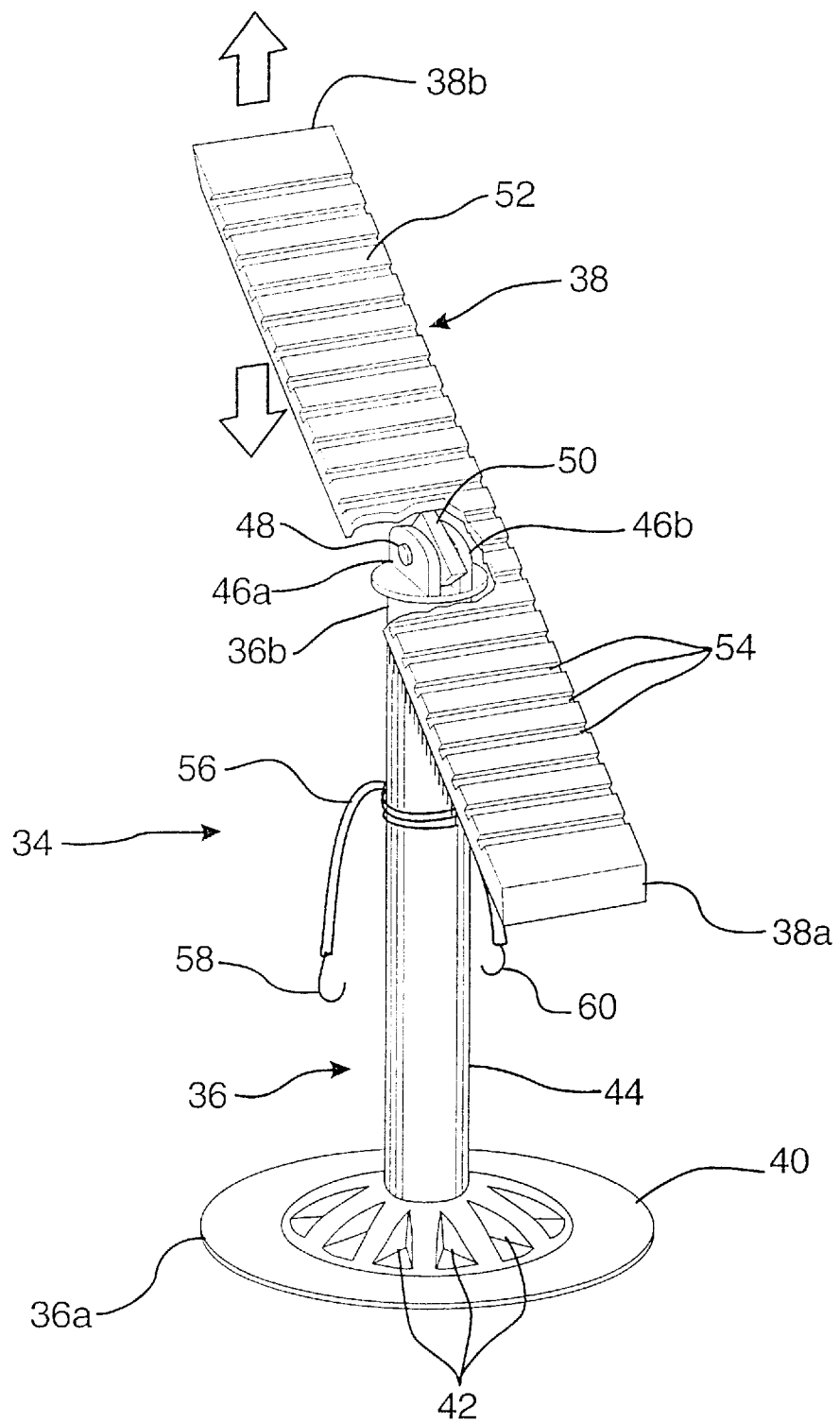
FIG. 3 is a partly broken perspective view showing the exit ramp according to the present invention, removed from the pool skimmer screen bucket, suggesting the pivotal adjustment of the platform upon its post.

Now referring to FIGS. 1, 2 and 3, there is provided a swimming pool skimmer well frog rescue device or exit ramp 34 according to a preferred embodiment of the invention. Exit ramp 34 comprises an upright foot member 36 defining a lower and an upper end 36a and 36b, and an elongated, inclined platform 38 attached to foot member upper end 36b in a manner which will be described hereinafter. Platform 38 defines a lower and an upper end 38a and 38b.

Foot member 36 comprises at its lower end 36a a substantially flat, discoid, rigid base 40, preferably, though optionally, provided with a number of perforations 42 therein to allow the passage of water therethrough. Foot member 36 further comprises a rigid upright post 44 which is fixedly attached to base 40 at its center, e.g. screwed therein. Post 44 can be cylindrical.

Foot member 36 comprises at its upper end 36b a pair of parallel, spaced-apart, upright pivot plates 46a, 46b fixedly attached to the upper end of post 44, holding a pivot pin 48 on which frictionally pivots a tongue 50 fixedly attached to the underface of platform 38. Thus, platform 38 can be forcibly pivoted against the friction force of tongue 50 on plates 46a, 46b so as to adjust the angular position of platform 38 relative to post 44, yet will retain its selected inclined position when unbiased.

Platform 38 defines a substantially flat upper surface 52 which is provided with traction means in the form of a plurality of transverse grooves 54.

Preferably, exit ramp 34 is provided with an elastic string 56 attached to the post 44 intermediate section, string 56 having two protruding free ends provided with hooks 58, 60.

In use, the exit ramp base 40 flatly and stably rests on the screen bucket bottom wall 30, with post 44 upwardly extending beyond the bucket to flange 32. Thus, inclined platform 38 will be mostly, if not completely, positioned above the level of the bucket top flange 32. Hooks 58, 60 are attached to flange 32 at diametrally opposite sides thereof, with the elastic string 56 being stretched to allow a tight attachment of post 44 to screen bucket 26. Platform 38 is then forcibly pivoted to a selected position, in which the platform upper end 38b will reach or extend beyond the well upper edge 18c.

Exit ramp 34 thus allows a frog F (FIG. 2) or other batrachian or small animal that is trapped in the pool skimmer well 18 to climb out of well 18 along the platform 38, with the help of the step-forming grooves 54, and onto the pool deck 13. As shown in FIG. 2, the pool skimmer well cover 19 has a part thereof that has been cut away at 19a, to allow a passage for the animals therethrough. It is understood, however, that the cover 19 may remain integrally unchanged by sliding it sidewards partly onto the pool deck 13. In any event, a passage must be provided from the well 18 onto the deck 13 for the animals to escape therethrough.

The purpose of the attachment of elastic string 56 onto screen bucket 26 is twofold:

1) First, it helps prevent exit ramp 34 from accidentally tilting sidewardly into an inoperative position, especially under the bias of waves generated in the pool water, for example when swimmers are active therein. These waves could indeed move exit ramp 34 until the platform upper end 38b is spaced from the well upper edge 18c, thus effectively preventing the animals from reaching the pool deck 13 by way of platform 38.

2) Second, it allows someone to easily manually grasp platform 38 to simultaneously retrieve the screen bucket 26 from well 18, for emptying it of the macroparticulate debris which may have accumulated therein.

Once bucket 26 is retrieved from well 18, the emptying operation of screen bucket 26 is also facilitated: by unhooking hooks 58, 60 and thereafter pulling exit ramp 34 out of bucket 26, the exit ramp base 40 will effectively dislodge most of the macroparticulate debris which may be stuck at the bottom of bucket 26. Although it is not shown in the drawings, it is envisioned that the perforated discoid base 40 preferably radially extend out to the skimmer basket peripheral wall 28, so as to cover the whole basket bottom wall 30. This way, it is easier to remove the debris from the bottom of the basket, since all the debris will rest on the flat upper surface of the removable exit ramp base 40.

It can be seen that the exit ramp of the invention is adapted to be located in the pool skimmer, where it will be out of the pool swimming area, and where it is most likely to benefit the small animals that fall into the pool, since the water current will naturally make them drift therein.

Preferably, the skimmer basket and exit ramp assembly are installed in the skimmer well so as to minimize water turbulence therein. Indeed, the preferred position of the exit ramp is with the platform lower end 38a located distally from the skimmer well opening 14, i.e. rotated 180° relative to its position shown in FIG. 1. This way, it will be easier for the small animals trapped in the skimmer well to climb onto the exit ramp platform 38, under these lower water turbulence conditions, than if platform 38 is subjected to stronger incoming water currents by facing the skimmer well opening 14.

An advantage of the exit ramp according to the invention is that it does not hamper the operation of the pool filter. Moreover, it helps the pool owner in the retraction and emptying of the screen bucket operations, since the bucket is easier to retrieve by grasping the exit ramp platform which protrudes above the water level, and since removing the exit ramp—and consequently its flat, discoid base—from the screen bucket helps remove the leaves and all debris accumulated in the bottom of the screen bucket.

Another advantage of the present invention is that it may be used by small animals of most sizes and shapes. Indeed, the lower end 38a of the inclined ramp 38 is located approximately at the water level, so that the floating animal reaching the exit ramp will not have to jump upon the deck to escape the pool water, but only to climb on the lower section 38a of inclined platform 38 of the exit ramp. Also, due to the fact that the platform 38 is inclined and elongated, even if the water level rises or lowers within a certain range, the platform will remain operational, since the water level will only rise or lower along the platform, on which access will still be possible.

An important advantage of the present invention is that the pivotal adjustement of the platform 38 allows the exit ramp 34 to be used in pool skimmer wells 18 of different sizes, within a certain range: indeed, if the well is deeper, then the platform need only be pivoted into a more vertical position to fit therein, since it will then extend vertically higher; however, if the pool skimmer well 18 is shallower, then the platform 38 may be pivoted into a more horizontal position, wherein it will extend beyond the well upper end 18c. In the latter case, it may be desirable for the pool owner to cut off the platform 38 exceeding length, i.e. the length of platform 38 which extends beyond the pool skimmer well upper edge 18c.

Also, it is envisioned that the exit ramp post and the exit ramp platform be telescopic, so as to allow adjustable length means, for allowing use of the exit ramp in skimmer wells of different sizes and shapes.

It can be seen that the exit ramp of the present invention provides an inexpensive, adjustable means for allowing small animals accidentally trapped inside the pool skimmer well to escape therefrom.

Any modifications to the present invention which do not deviate from the scope of the present invention, are considered to be included therein.

For example, the foot member 36 shown in the drawings is considered to be the preferred mode to carry out the invention, but it may be modified into alternate embodiments: the foot member could be a tripod resting on the bottom of the screen bucket, with the platform pivot being located at the intersection of the three foot branches; it could also be composed of several horizontal rigid arm members projecting radially outwardly from the platform pivot to snap onto the bucket lateral edge. This last embodiment would not include any elastic string, since the arm members snapping onto the bucket would provide attachment means of the exit ramp thereon.

In this respect, the attachment means shown as the elastic string in the drawings could also be substantially different: there could be provided telescopic, radially-projecting arms snapping onto the bucket upper edge, or onto the peripheral wall of the bucket; there could also be provided a base or foot member having hooks or brackets adapted to engage the screen bucket bottom wall.

Also, the grooves 54 provided on the upper surface of the platform 38 could be replaced by other suitable traction means, such as a rough surface or small holes.

The exit ramp platform of the invention is shown to be flat, rectangular and elongated, but it is envisioned to use different platform sizes and shapes to accommodate skimmer wells or other pool areas of different sizes and shapes. For example, the platform could be helicoidal and have either an inclined or a vertical axis, with the animals climbing along the inclined surface of the helicoidal platform. Also, the platform could have a hollow tubular body. Thus, it is understood that throughout the present text, the mention of an elongated platform refers to the fact that the platform must extend from the water level to the dry ground, and must comprise an inclined upper surface along which the trapped animals may climb to reach the safety of the dry ground.

It is further envisioned to provide a skimmer bucket integrally molded or produced with an exit ramp therein.

Finally, the exit ramp of the present invention has been shown as adapted to be used in swimming pool skimmers, and indeed the best mode to carry out the invention is such an exit ramp. However, it is understood that the exit ramp according to the invention could be adapted to be used in other small or large pools or water bodies, such as above-ground pools, fountains or the like, with no or only minor modifications to the design of the exit ramp.

I claim:

1. An animal rescue device for use inside a swimming pool skimmer well, for allowing stranded small animals to escape from the well to dry land, the swimming pool well of the type having a top mouth above water level and a lateral access port partly located beneath water level, the well being made adjacent the swimming pool side wall; said rescue device comprising:
   a) a supporting foot member defining an upper and a lower end, and destined to stably rest by its said lower end on the flooring of said pool skimmer well;
   b) an elongated platform having an upper free surface; and
   c) mounting means, for mounting an intermediate section of said elongated platform to said foot member upper end for forcible relative movement thereabout, and for maintaining same in unbiased condition in an inclined position so as to define an upper and a lower extremity thereof;
   d) a skimmer bucket, sized to fit wholly inside the skimmer well; said bucket having a peripheral perforated wall, a bottom base wall edgewisely integral to said peripheral wall, and a top open mouth; wherein said foot member freely rests on said bucket base wall and extends upwardly therefrom and through said bucket top mouth, and at least a major section of said platform extends above said bucket top mouth;
   wherein said rescue device is destined to be partly submerged in the water of the pool, with said inclined platform lower extremity destined to be approximately at the water level and said platform upper extremity destined to extend upwardly therefrom out of the water and beyond the well top mouth.

2. A rescue device as defined in claim 1, further comprising attachment means installed on said foot member for fixedly and removably attaching said rescue device to the pool skimmer.

3. A rescue device as defined in claim 2, wherein said attachment means is a pair of elastic strings attached to said foot member and provided with hooks destined to removably engage said screen bucket upper edge.

4. A rescue device as defined in claim 1, wherein said foot member comprises an upright post and a substantially flat base destined to flatly engage the skimmer bucket bottom wall, said base allowing passage of the water at least partly through the screen bucket bottom wall.

5. A rescue device as defined in claim 4, wherein said attachment means link said upright post and said skimmer bucket, said platform comprising grasping means for manually grasping same and removing said rescue device from the skimmer well.

6. A rescue device as defined in claim 5, wherein said foot member base extends over a significant area of said skimmer bucket bottom wall but short of its said peripheral wall, wherein retrieval of said foot member from said skimmer bucket allows removal of macroparticulate debris accumulated inside said skimmer bucket.

7. A rescue device as defined in claim 1, wherein said platform member has traction means on its upper surface to help the animals to climb thereon.

8. A rescue device as defined in claim 7, wherein said traction means are grooves made transversely of said platform upper surface all along the length thereof.

9. A rescue device as defined in claim 1, wherein said foot member is integrally fixed to said skimmer bucket.

* * * * *